United States Patent

[11] 3,561,712

[72] Inventor Joe B. Newsome
     East Point, Ga.
[21] Appl. No. 793,829
[22] Filed Jan. 24, 1969
[45] Patented Feb. 9, 1971
[73] Assignee Southern States, Inc.
     a corporation of Georgia

[54] ADJUSTABLE SUPPORT DEVICE
     2 Claims, 4 Drawing Figs.
[52] U.S. Cl. .................................................. 248/221,
                                    248/226, 248/230, 24/249
[51] Int. Cl. ....................................................... F16m 13/00,
                                                                 E04h 12/00
[50] Field of Search........................................... 248/221,
                                               226.3, 230, 231, MS; 52/40

[56]                    References Cited
                    UNITED STATES PATENTS
597,947    1/1898   Bragger.......................... 248/230
901,284   10/1908   Edmunds....................... 248/230
1,893,702  1/1933   Glenn............................ 248/221UX
2,705,121  3/1955   Kaminky et al................. 248/230
2,761,643  9/1956   Ward et al..................... 248/221X Primary Examiner—Roy D. Frazier
Assistant Examiner—William H. Schultz
Attorney—Walter M. Rodgers ABSTRACT: An adjustable support device for mounting on poles of different sizes is disclosed and comprises a pair of hingedly connected arcuate clamping elements which are of generally semicircular configuration arranged to envelop a pole and the ends thereof remote from the hinged connection therebetween are interconnected by a pair of gripping hooks which cooperate with gripping apertures formed in the ends of the clamping elements. The gripping hooks are adjustable relative to each other by means of a threaded connector. A plurality of mounting brackets are disposed about the periphery of the support device and are adjustable in a peripheral direction relative to the support device, the mounting brackets being particularly well adapted for supporting electric apparatus such as disconnect switches and the like. Apertures are provided in the clamping elements into which spikes or lugs are inserted for securing the clamping element positively to the associated pole.

PATENTED FEB 9 1971

3,561,712

INVENTOR
JOE B. NEWSOME

BY *Walter M. Rodgers*

ATTORNEY

ADJUSTABLE SUPPORT DEVICE

Known support devices for use in mounting electric apparatus onto line supporting poles ordinarily comprise many different parts and ordinarily are not adapted for use in conjunction with poles of different diameters.

According to the present invention a support device is provided which is readily adjustable and which therefore is usable in connection with poles of different diameters. A device constructed according to this invention may comprise a pair of hingedly connected arcuate clamping elements each having one or more gripping surfaces formed thereon remote from the hinge together with a pair of gripping devices which selectively engage the gripping surfaces of the clamping elements. A plurality of mounting brackets are adjustably mounted on the clamping elements for supporting apparatus such as switchgear. Preferably apertures are provided in the clamping elements for receiving spikes driven into the pole so as to form a positive means for securing the clamping elements to the pole.

For a better understanding of the invention, reference may be had to the following detailed description taken in conjunction with the accompanying drawings in which.

Figure 1:
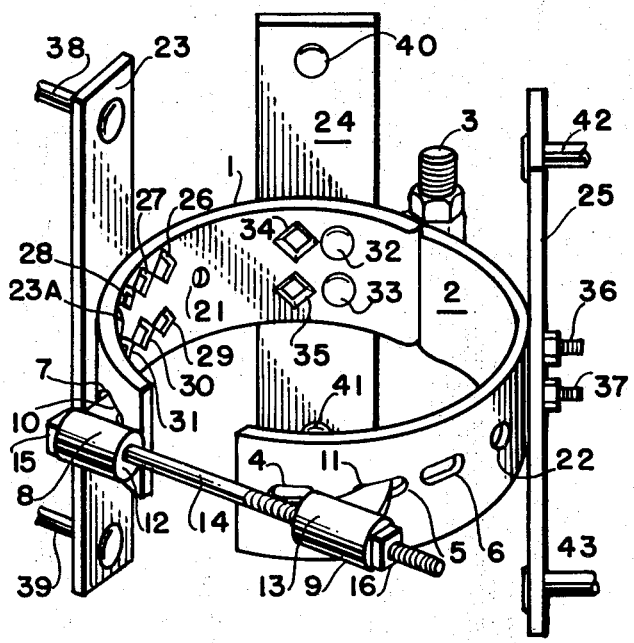
FIG. 1 is a perspective view of a support device constructed according to the invention and depicting the device as a separate structure from the pole on which it is adapted for mounting.

In the drawings the pole is designated by the letter P.

The support device comprises a pair of arcuate clamping elements designated by the numerals 1 and 2 which are hingedly connected to each other by the hinge 3. The hinge structure is of conventional construction. At the ends of the arcuate clamping elements 1 and 2 remote from hinge 3, a plurality of gripping surfaces 4, 5, and 6 are formed in clamping element 2 while similar gripping surfaces designated at 7 are formed in clamping element 1. As shown in the drawing these gripping surfaces constitute apertures but of course could be outwardly protruding projections or some other structure if desired.

For engaging the gripping surfaces such as are indicated at 4, 5, 6 and 7, a pair of gripping devices designated by the numerals 8 and 9 are provided. These gripping devices may constitute hooks such as are designated at 10 and 11 which are formed integrally with the body portions 12 and 13 of the gripping devices 8 and 9. A bolt 14 having a head 15 and a threadedly mounted nut 16 is provided for adjusting the spacing between the gripping devices 8 and 9 as is obvious from the drawings.

Figure 2:
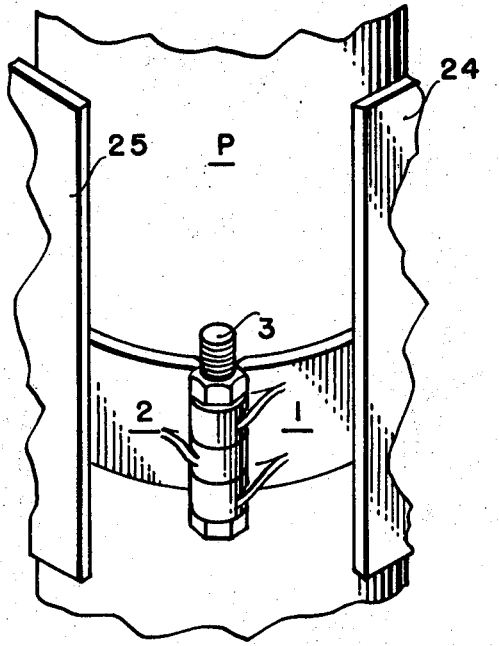
FIG. 2 is a perspective view of the structure shown in FIG. 1 as it appears from the opposite side from that depicted in FIG. 1 and wherein a portion of the pole is shown.
Figure 3:
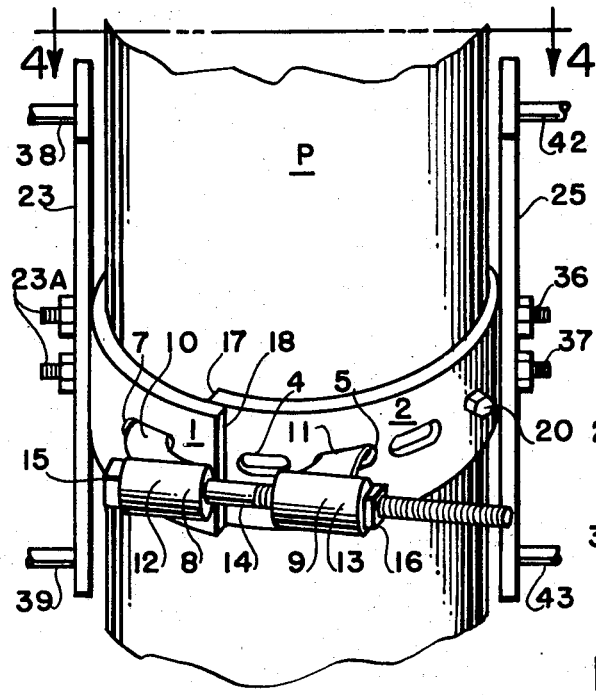
FIG. 3 is a view similar to FIG. 1 but showing the support device mounted on an associated pole and locked in position thereon.
Figure 4:
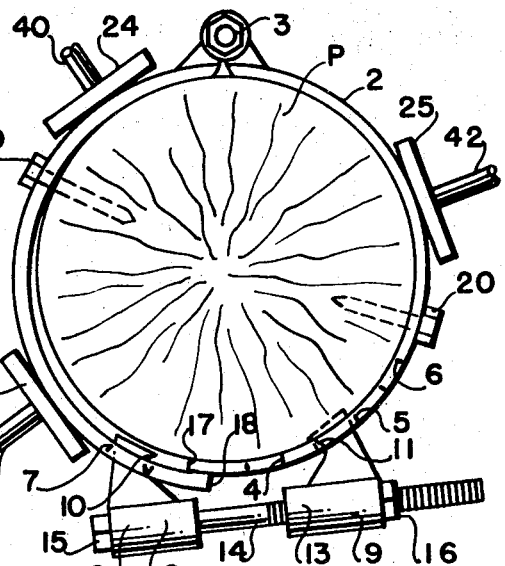
FIG. 4 is a cross-sectional view taken on the line designated 4—4 in FIG. 3.

Thus with the clamping elements 1 and 2 disposed about the pole P as shown in FIGS. 2, 3 and 4, the gripping devices 8 and 9 are disposed with their hooks 10 and 11 inserted into certain apertures such as 7 and 5. When the nut 16 is tightened the clamping elements are drawn together so as to form a secure and tight band about the pole. As is apparent particularly in FIGS. 3 and 4, one end of the clamping element 2 such as is indicated at 17 may be disposed inside the end 18 of clamping element 1.

For positively securing the support device to the pole P, a plurality of spikes or bolts may be employed such as are designated in the drawings by the numerals 19 and 20. The spikes 19 and 20 are inserted through apertures such as are indicated at 21 and 22.

From the description thus far it is apparent that any one of the apertures 4, 5 or 6 may be selectively employed in connection with the gripping device 9 dependent upon the diameter of the pole P. Similarly a plurality of gripping apertures may be formed in the clamping element 1 and such apertures may be engaged selectively by the hook 10 of gripping element 8, only one aperture 7 being shown in the drawings.

For the purpose of providing support for electrical apparatus to be mounted on the pole P, a plurality of mounting brackets are disposed about the periphery of the support device. These mounting brackets are designated in the drawings by the numerals 23, 24 and 25. Mounting bracket 23 is secured to clamping element 1 by bolts 23A. A plurality of openings such as are designated by the numerals 26, 27, 28, 29, 30 and 31 are provided which are disposed in different positions about the periphery of clamping element 1. Thus by a suitable choice of mounting aperture 26, 27, 29, 29, 30, 31 as the aperture into which bolts 23A are inserted, the position of mounting bracket 23 can be selectively determined as is obvious from the drawings.

In similar fashion bracket 24 is supported by bolts 32 and 33 which are inserted through apertures formed in clamping element 1. Alternate positions for the bolts 32 and 33 are provided in the form of apertures 34 and 35 into which bolts 32 and 33 may be inserted if desired. In like fashion mounting bolts 36 and 37 which are associated with mounting bracket 25 preferably are provided with alternate apertures so that bracket 25 may be adjusted in a peripheral direction relative to clamping element 2.

For securing electrical apparatus to mounting bracket 23, suitable structure such as bolts 38 and 39 is provided. Similarly bolts such as are indicated at 40 and 41 are provided in connection with mounting bracket 24 and similar bolts 42 and 43 are provided in connection with mounting bracket 25.

From the foregoing description and as is apparent from the drawings, the support device of this invention is well adapted for use in conjunction with poles of different diameters and is provided with a number of adjustable features whereby the electric apparatus to be mounted on the pole is adjustable peripherally of the pole and of the support device.

I claim:

1. An adjustable support device comprising a pair of hingedly connected, arcuate, clamping elements, a plurality of gripping surfaces formed on at least one of said elements in a portion thereof remote from its hinged connection with the other of said elements, at least one gripping surface formed on the other of said elements in a portion thereof remote from its hinged connection with said one element, connecting means having a pair of gripping devices each arranged to engage a gripping surface on different clamping elements, the spacing between said gripping devices being adjustable and at least one of said gripping devices being selectively engageable with a gripping surface of said one clamping element, and a plurality of mounting brackets secured to said device, the positions of said brackets being adjustable in a peripheral direction.

2. A support device according to claim 1 wherein said gripping surfaces comprise apertures formed in said clamping elements and wherein said gripping devices comprise a pair of hooks which are insertable in said apertures.